Patented July 31, 1928.

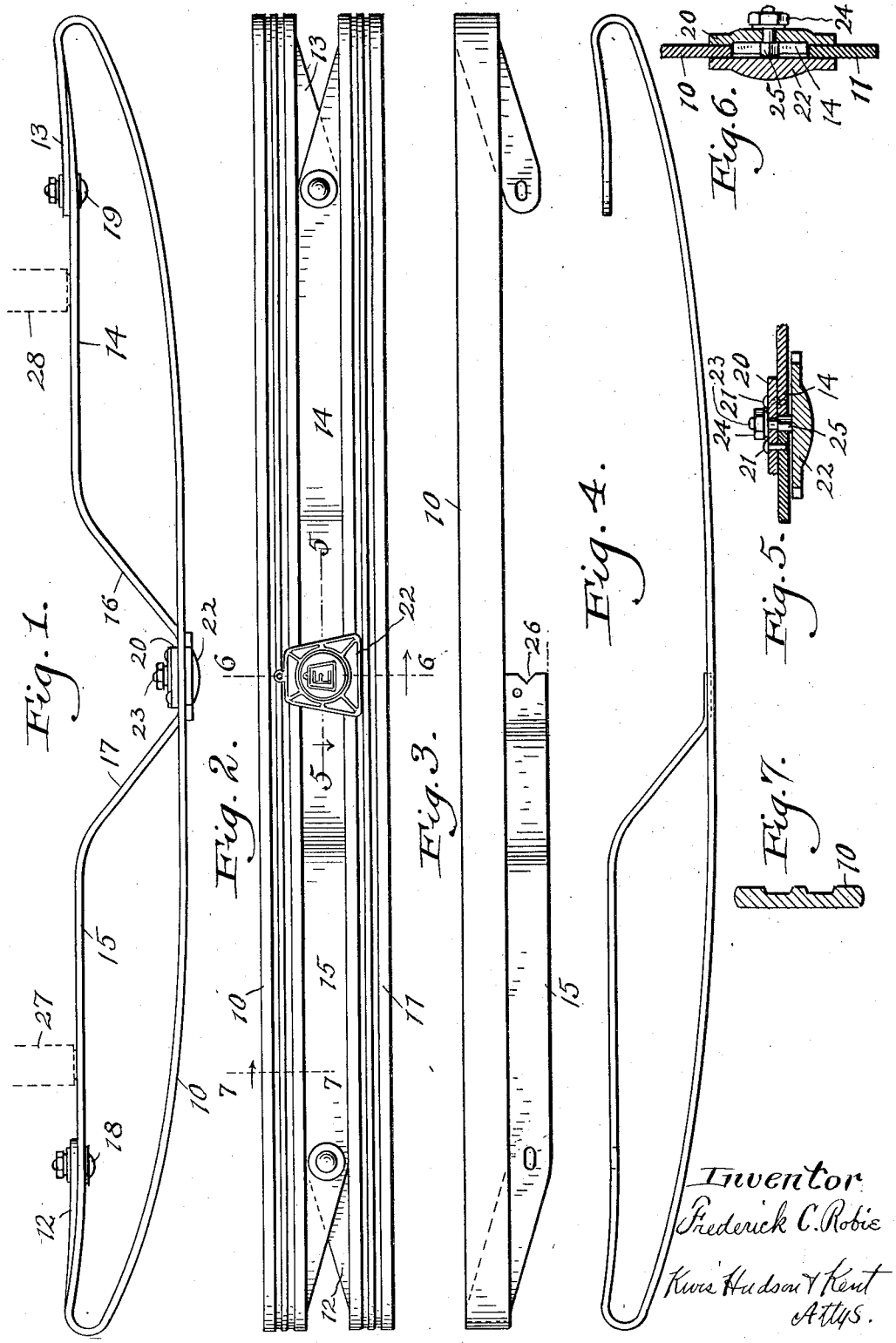

1,678,916

UNITED STATES PATENT OFFICE.

FREDERICK C. ROBIE, OF CLEVELAND, OHIO, ASSIGNOR TO THE EATON AXLE & SPRING COMPANY, OF CLEVELAND, OHIO, A CORPORATION OF OHIO.

BUMPER.

Application filed February 8, 1926. Serial No. 86,730.

This invention relates to automobile bumpers and has for one of its objects the provision of a bumper construction that will be economical to manufacture and have exceptional strength for the purpose of resisting impacts to which it may be subjected in service.

A further object of the invention is to provide a bumper having a plurality of vertically spaced impact bars the end portions of which are bent to the rear and inwardly and so connected as to form a rear reinforcing and supporting bar, the bumper consisting, essentially, of two similar parts that are reversely arranged and, on account of their similarity, being adapted for economical production by the same manufacturing equipment.

Other objects of the invention and the features of novelty will be apparent from the following description taken in connection with the accompanying drawings in which Fig. 1 is a plan view of a bumper embodying my invention; Fig. 2 is a front view of the same; Fig. 3 is a front view of one of the bars of which the bumper is made; Fig. 4 is a plan view thereof; Fig. 5 is a horizontal section on the line 5—5 of Fig. 2; Fig. 6 is a vertical section on the line 6—6 of Fig. 2; and Fig. 7 is an enlarged detail section on the line 7—7 of Fig. 2.

Referring to the drawings 10 and 11 indicate the impact-receiving portions of two similarlly formed but reversely arranged bars which are spaced apart vertically as will be seen from Fig. 2. The bar 11 has a relatively short end 12 that is bent or looped rearwardly and then inwardly, at one end of the bumper. The bar 10 has a short end 13 similar to the end 12 but arranged at the opposite end of the bumper. The bar 11 also has a relatively long end 14 which is looped or bent to the rear and extends inwardly and the bar 10 has a similar long end 15, the ends 14 and 15 being deflected forwardly, as shown at 16 and 17, respectively, into the plane of the impact-receiving portions 10 and 11, at the middle thereof. The ends 12, 13, 14 and 15 are also bent or deflected vertically, adjacent the ends of the bumper and the short end 12 of one bar is secured to the long end 15 of the other bar by a bolt 18 or any other suitable form of connection. Similarly the ends 13 and 14 are connected by a bolt 19.

The ends 14 and 15 are preferably arranged in abutting relation at the middle of the bumper and are connected together by a plate 20 which is secured to the ends by rivets 21. The plate 20 engages the rear faces of the impact-receiving portions 10 and 11, as shown in Fig. 6, and a member 22, in the form of an emblem or other ornament engages the front faces of the portions 10 and 11 and has a bolt 23 integral therewith which extends through the plate 20, the parts being clamped together by the nut 24. The bolt 23 has a square portion 25 which engages with the V-shaped notches 26, in the ends 14 and 15, to hold the member 22 from turning. The space between the plate 20 and the member 22, that is occupied by the ends of the bars 14 and 15, is slightly wider than the thickness of the bars so that the plate 20 and the member 22 will be firmly clamped against the sides of the bars 10 and 11.

From the foregoing it will be seen that the bumper construction, which I have devised, will be of unusual strength because of the reinforcement of the impact-receiving bars by the back bar which is formed by the ends 14 and 15. The construction has the further advantage that, while the bars are made from spring steel, they are so secured together and reinforced that they will not vibrate materially when in use. The similarity of the bars 10 and 11 permits them to be manufactured by the same equipment, thereby reducing the manufacturing cost to a minimum.

At 27 and 28 I have indicated the ends of the automobile frame and it will be understood that the parts 14 and 15 will be secured to these ends by suitable connections, that are well known in the art and are therefore not shown.

Having thus described my invention, what I claim is:

1. In an automobile bumper, the combination of two parallel impact receiving bars spaced apart vertically and joined at the ends of the bumper and having extensions from said joints meeting at the middle of the bumper between the impact bars and substantially in the same plane therewith, a clamp comprising a plate bridging the forward sides of said impact bars and a plate bridging the rear sides of the impact bars, and a bolt joining said plates and adapted to clamp them tightly upon said impact bars, said meeting ends being attached to one of said clamping plates and spaced slightly from the other plate.

2. In an automobile bumper, the combination of two parallel impact receiving bars spaced apart vertically and having their ends bent to the rear of the bumper and then inwardly, the inwardly extending end portions of said bars being of different lengths, said bars being similar in shape but reversely arranged, means for securing the shorter end of each bar to the longer end of the other bar adjacent the ends of the bumper, said longer ends extending to the middle of the bumper and being bent inwardly to a position between said impact bars and meeting substantially in the plane of said impact bars, a clamp comprising a plate bridging the forward sides of said impact bars and a second plate bridging the rear sides of the same, and a bolt joining said plates and adapted to clamp them tightly upon said impact bars, said meeting ends being attached to one of said clamping plates and spaced slightly from the other plate.

In testimony whereof, I hereunto affix my signature.

FREDERICK C. ROBIE.